US006349989B1

(12) United States Patent
Kim

(10) Patent No.: US 6,349,989 B1
(45) Date of Patent: Feb. 26, 2002

(54) VIBRATION PROTECTED TAILGATE STRUCTURE FOR AUTOMOBILE

(75) Inventor: Yong-Soo Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/577,272

(22) Filed: May 23, 2000

(30) Foreign Application Priority Data

Dec. 4, 1999 (KR) .............................................. 99-55007

(51) Int. Cl.[7] .................................................. B60J 5/00
(52) U.S. Cl. ........................ 296/207; 296/146.9; 296/56
(58) Field of Search ............................... 296/56, 146.8, 296/146.9, 207; 292/342; 16/86 B, 82, 85, 83, 86 R, 86 A

(56) References Cited

U.S. PATENT DOCUMENTS 4,192,039 A * 3/1980 Haberle et al. ............. 16/86 B
6,039,389 A * 3/2000 Monette et al. ............. 296/207

FOREIGN PATENT DOCUMENTS

| FR | 2632-576 A | * 12/1989 | .................. 296/207 |
| JP | 57-147923 A | * 9/1982 | .................. 296/207 |

* cited by examiner

Primary Examiner—Stephen T. Gordon
Assistant Examiner—Jason Morrow
(74) Attorney, Agent, or Firm—Christie, Parker & Hale, LLP

(57) ABSTRACT

A vibration protected tailgate structure for an automobile constructed to reduce generation of noise occurring in the opening direction of the tailgate, the structure including first and second guide bumpers, respectively, mounted at the tailgate and a body and contacted when the tailgate is closed thereby restricting vibration of the tailgate, the structure comprising: a hitching groove formed on one of the bumpers; and a hitching unit formed on the other bumper for being hitched by the hitching groove when the tailgate is closed thus restricting vibration of the tailgate and is detached from the hitching groove when the tailgate is opened.

3 Claims, 5 Drawing Sheets

VIBRATION PROTECTED TAILGATE STRUCTURE FOR AUTOMOBILE

BACKGROUND OF THE INVENTION

1. Field of the Invention

The present invention relates to a vibration protected tailgate structure for an automobile, and more particularly to a vibration protected tailgate structure adapted for use to prevent vibration caused by the vibration of an automobile and thereby to reduce noise generated by the tailgate.

2. Description of the Prior Art

Generally, an automobile is mounted with a plurality of doors openable and closeable for passengers to get in and out, cargo to be loaded and unloaded, and a tailgate is installed at a "one-box car" such as a jeep or the like. The tailgate 50 is hinged to an upper end of roof panel (R) at the rear side of body (B), and when tailgate 50 is opened or closed, cargo can be received or taken out from the rear side of the automobile, as illustrated in FIG. 4.

Between tailgate 50 and body (B), there is installed a waterproof weather strip and a guide bumper to prevent shaking and swaying of the tailgate.

As illustrated in FIG. 5, tailgate 50 is mounted with a first guide bumper 53 fixed at a longitudinal end thereof by bolts 52, and a second guide bumper 56 disposed at body (B) for restricting "H" and "L" directions by allowing the first guide bumper 53 and first/second contact surfaces 54 and 55 to adhere when tailgate 50 is closed.

In other words, when tailgate 50 is closed, the first and second guide bumpers 53 and 56 closely adhere to prevent tailgate 50 from vibrating in the "H" and "L" directions.

However, the problem is that the tailgate generates noise due to its vibration while an automobile is running because vibration generated in the opening direction of the tailgate cannot be restricted in case the mutually adhered first and second guide bumpers are intended for use in restricting the vibration of the tailgate.

SUMMARY OF THE INVENTION

The present invention is disclosed to solve the aforementioned problem and it is an object of the present invention to provide a vibration protected tailgate structure for an automobile which is constructed to reduce generation of noise occurring in the opening direction of the tailgate.

In accordance with the object of the present invention, there is provided a vibration protected tailgate structure for automobiles, the structure including first and second guide bumpers, respectively, mounted at the tailgate and a body and contacted when the tailgate is closed to thereby restrict vibration of the tailgate, the structure comprising:

a hitching groove formed on one of the bumpers; and hitching means hitched by the hitching groove when the tailgate is closed to restrict vibration of the tailgate and formed on the other bumper for being hitched by the hitching groove when the tailgate is closed to restrict the vibration of the tailgate and detached from the hitching groove when the tailgate is opened.

BRIEF DESCRIPTION OF THE DRAWINGS

For fuller understanding of the nature and objects of the invention, reference should be made to the following detailed description taken in conjunction with the accompanying drawings in which:

FIG. 1b is a sectional view illustrating an opened state of the tailgate in FIG. 1a;

FIG. 3 is a sectional view taken along line A—A in FIG. 1a;

DETAILED DESCRIPTION OF THE INVENTION

Figure 1A:
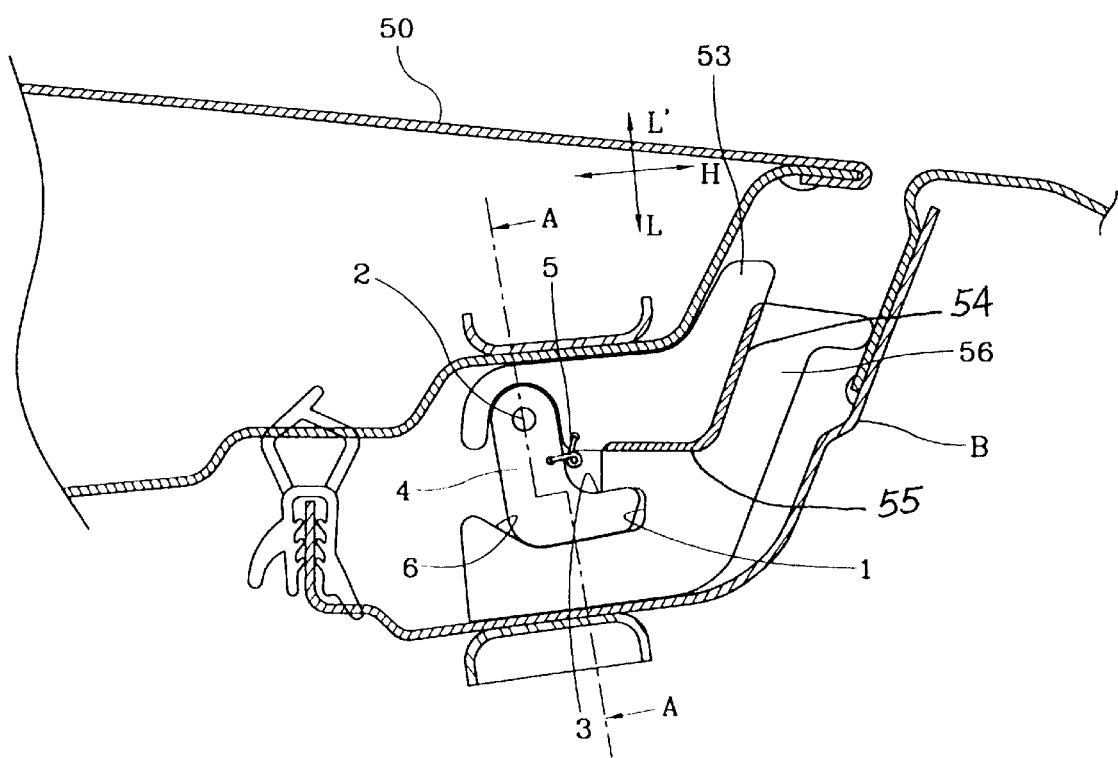
FIG. 1a is a sectional view illustrating a hitched state of a vibration protected tailgate structure for an automobile according to the present invention.

FIGS. 1a, 1b, 2 and 3 are, respectively, sectional views, an exploded perspective view and a sectional view taken along line A—A illustrating a vibration protected tailgate structure for automobiles according to the present invention, where the structure includes a hitching groove 1 formed at a first guide bumper 53 or a second guide bumper 56 for restricting the opening direction of tailgate 50, hitching means formed at the first guide bumper 53 or at the second guide bumper 56 for being hitched at the hitching groove 1 when tailgate 50 is closed and for being detached from the hitching groove 1 when tailgate 50 is opened.

The hitching means includes rotary arm 4 rotatively mounted at rotary axle 2 of the first guide bumper 53 and formed with hitching portion 3 at a longitudinal end for being inserted into hitching groove 1, resilient means for providing resilience so that hitch portion 3 of rotary arm 4 can be detached from hitching groove 1 when tailgate 50 opens and a guide means for allowing rotary arm 4 to be pushed and inserted into the hitching groove when tailgate 50 is closed.

The resilient means is spring 5 fixed to both ends of rotary arm 4 and the first guide bumper 53 to provide a resilience such that rotary arm 4 can always be rotated clockwise, as illustrated in the drawing.

Furthermore, the guide means is a curved guide portion 6 extending from hitching groove 1 for guiding the rotary arm to be rotated counterclockwise and inserted into the hitching groove when the rotary arm contacts the curved guide portion.

Now, the operational effect of the present invention thus constructed will be described.

Figure 1B:
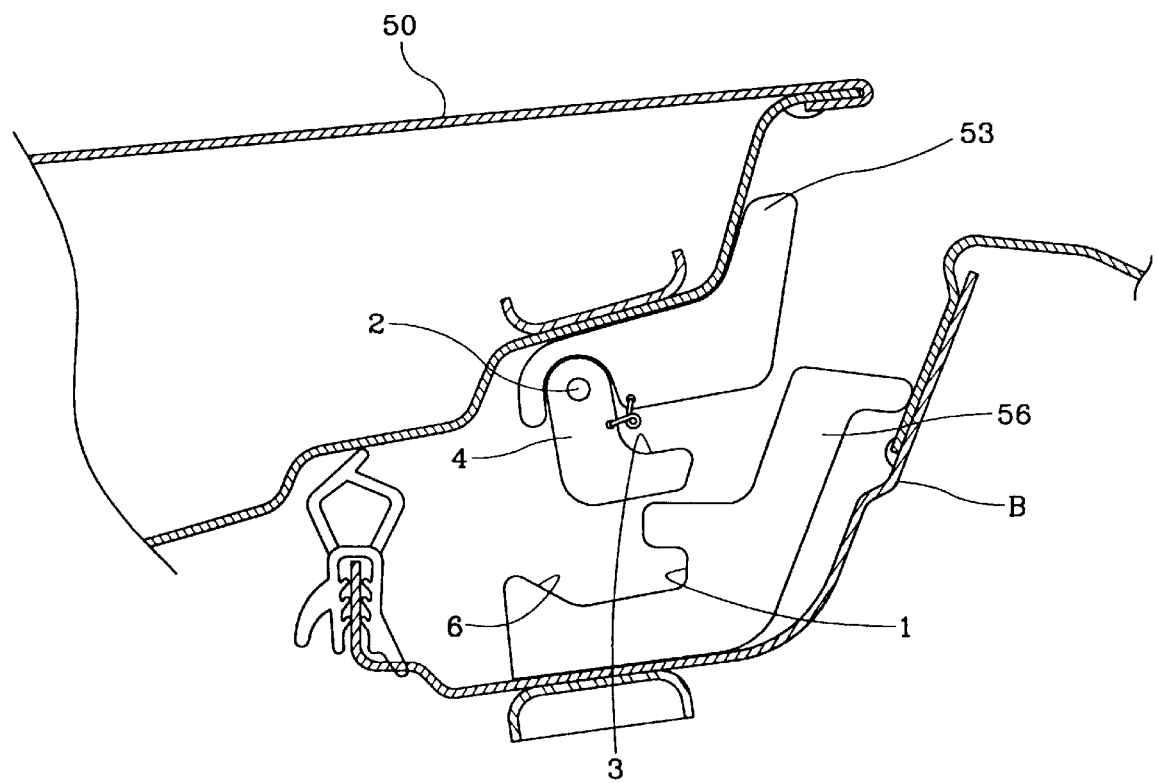
Figure 2:
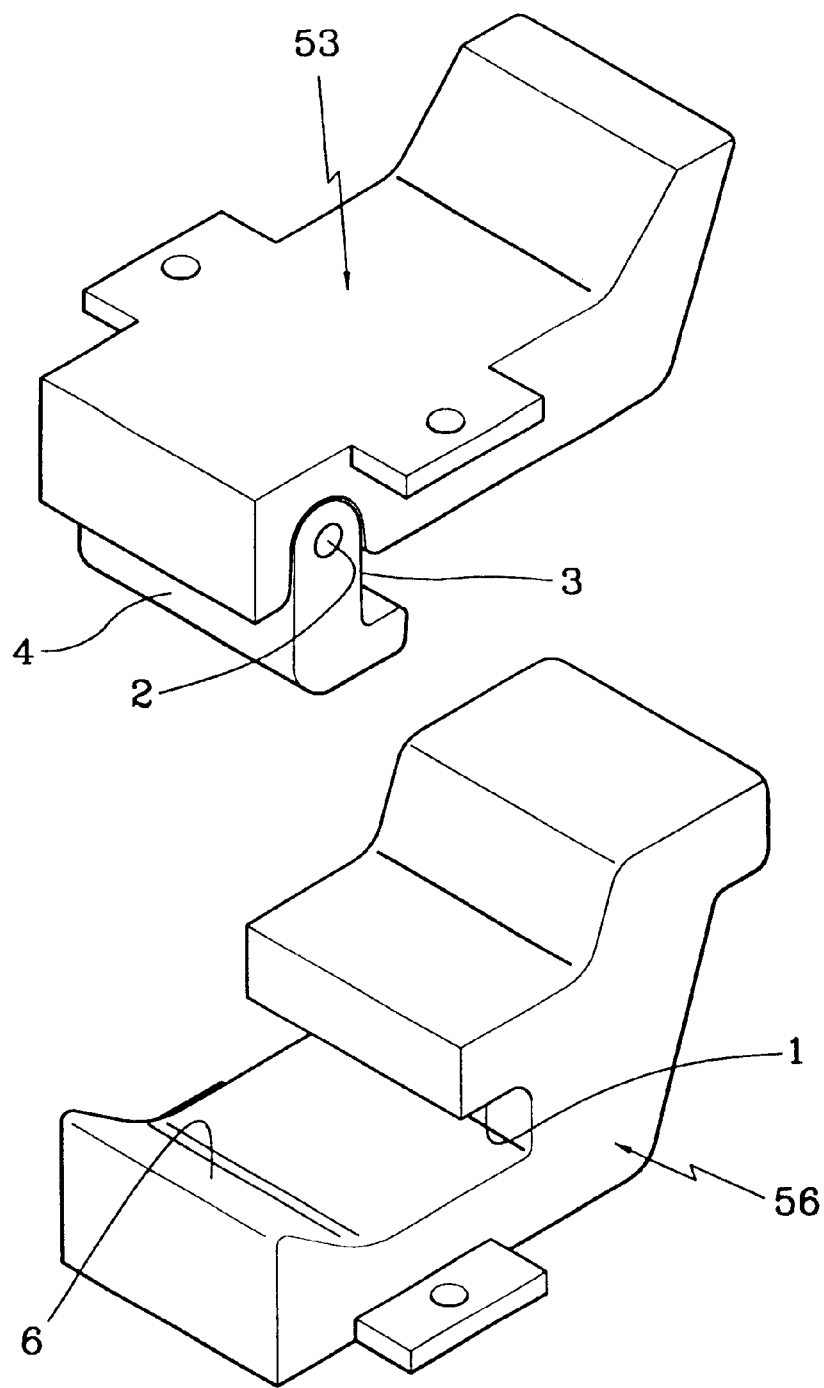
FIG. 2 is an exploded perspective view illustrating both first and second guide bumpers shown in FIG. 1.
Figure 3:
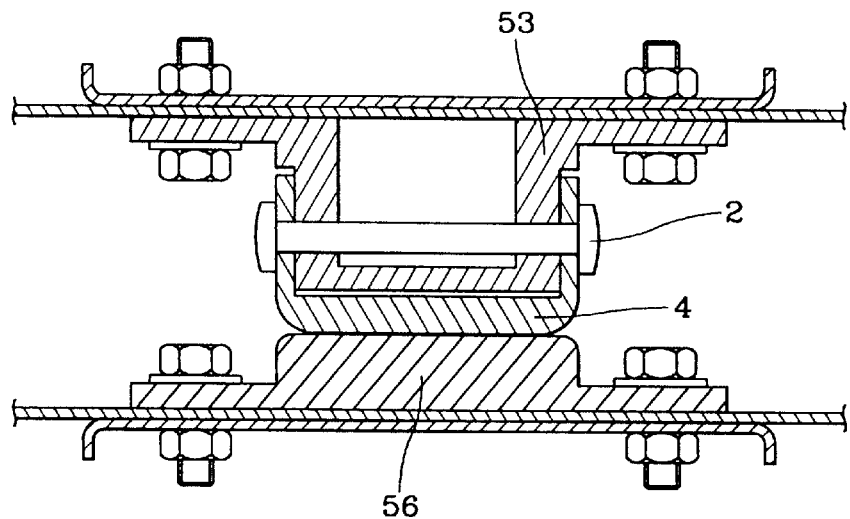
Figure 4:
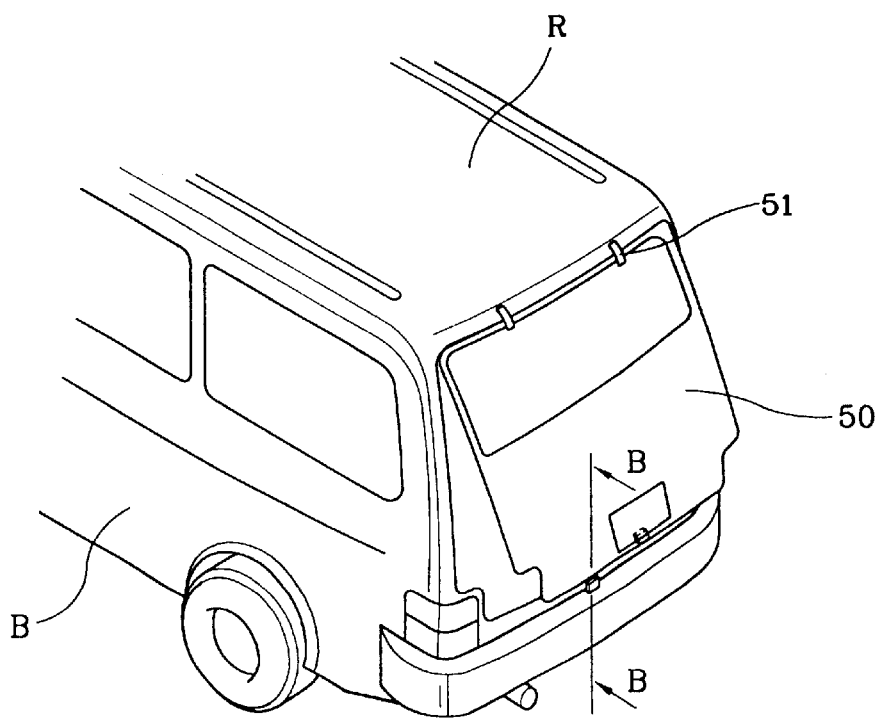
FIG. 4 is a schematic perspective view illustrating an automobile mounted with a tailgate according to the prior art.
Figure 5:
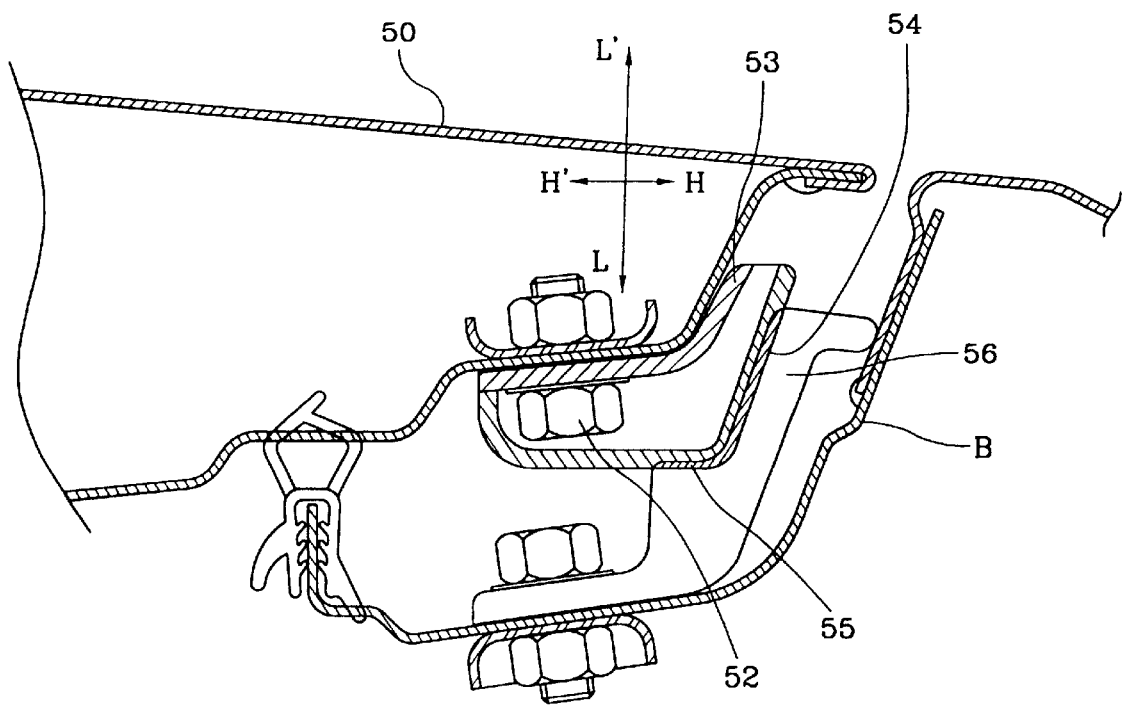
FIG. 5 is a sectional view taken along line B—B showing a closed state of the tailgate in FIG. 4.

When tailgate 50 is opened, the rotary arm 4 mounted at the first guide bumper 53 at tailgate 50 is rotated clockwise by the resilience of spring 5 as illustrated in FIG. 1b.

Under this state, when tailgate 50 is closed, the first and second guide bumpers 53 and 56 are closely contacted while a longitudinal end of rotary arm 4 contacts the curved guide portion 6.

When the rotary arm 4 contacts curved guide portion 6, it rides on the curved guide portion 6 to rotate counterclockwise and to be pushed into the hitching groove 1. When the rotary arm 4 is pushed into the hitching groove 1, the hitching portion 3 is hitched by the hitching groove 1 to keep the rotary arm 4 from moving in the opening direction of tailgate 50, as illustrated in FIG. 1a.

In other words, first and second contact surfaces 54 and 55 restrict movement of the "H" and "L" directions of tailgate 50 and simultaneously rotary arm 4 and hitching groove 1 restrict movement of L' direction (opening direction of the tailgate) to thereby prevent the tailgate 50 from vibrating.

Particularly, when hitching portion 3 of rotary arm 4 is inserted into hitching groove 1, the first and second contact surfaces 54 and 55 closely adhere and are compressed to a predetermined pressure while the rotary arm 4 pulls the second guide bumper 56 and the first and second bumpers 53 and 56 are compressed and adhered therebetween, such that the first and second guide bumpers 53 and 56 are securely coupled.

Even when an automobile runs with the first and second guide bumpers 53 and 56 securely coupled, as explained above, and the tailgate 50 sways in an L' direction, the tailgate 50 does not vibrate because tailgate 50 is restricted by rotary arm 4, thereby eliminating generation of noise.

When a user opens tailgate 50 under this state, the first and second guide bumpers 53 and 56 are detached where, as the rotary arm 4 always receives a force to rotate clockwise according to the spring 5, the hitching portion 3 of rotary arm 4 slips out from hitching groove 1 of second guide bumper 56. When hitching portion 3 of rotary arm 4 slips out from hitching groove 1, the tailgate 50 can be opened.

As apparent from the foregoing, there is an advantage in the vibration protected tailgate structure for an automobile thus described according to the present invention in that noise generated by the vibration in the opening direction of the tailgate can be reduced.

I claim:

1. A vibration protected tailgate structure for an automobile, the structure including first and second guide bumpers, respectively, mounted at the tailgate and a body and contacted when the tailgate is closed to thereby restrict vibration of the tailgate, the structure comprising:

a hitching groove formed on one of the bumpers; and hitching means formed on the other bumper for being hitched by the hitching groove when the tailgate is closed to restrict the vibration of the tailgate and detached from the hitching groove when the tailgate is opened;

wherein the hitching means comprises:

a rotary arm rotatively mounted at one of the guide bumpers and formed with a hitching portion at a longitudinal end for being inserted into the hitching groove;

resilient means for providing resilience so that the hitching portion of the rotary arm can be detached from the hitching groove when the tailgate opens; and guide means for allowing the rotary arm to be pushed and inserted into the hitching groove when the tailgate is closed.

2. The structure as defined in claim 1, wherein the resilient means is a spring fixed to the rotary arm and one of the guide bumpers to provide resilience such that the rotary arm can always be rotated clockwise.

3. The structure as defined in claims 1 or 2, wherein the guide means is a curved guide portion extending from the hitching groove and for guiding the rotary arm to be rotated counterclockwise and inserted into the hitching groove when the rotary arm contacts the curved guide portion.

* * * * *